(12) United States Patent
Chen et al.

(10) Patent No.: US 7,380,824 B2
(45) Date of Patent: Jun. 3, 2008

(54) WHEELCHAIR SUSPENSION

(75) Inventors: Yung-Hsin Chen, Kaohsiung Hsien (TW); Yung-Yuan Liao, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 282 days.

(21) Appl. No.: 11/373,455

(22) Filed: Mar. 9, 2006

(65) Prior Publication Data
US 2007/0209845 A1    Sep. 13, 2007

(51) Int. Cl.
*B60R 21/00* (2006.01)
(52) U.S. Cl. .................. 280/755; 180/907; 280/304.1
(58) Field of Classification Search ............. 180/65.1, 180/907; 280/220, 304.1, 124.169, 124.175, 280/755; 297/DIG. 4
See application file for complete search history.

(56) References Cited

U.S. PATENT DOCUMENTS

| | | | |
|---|---|---|---|
| 7,055,634 B2 * | 6/2006 | Molnar | ............ 180/65.1 |
| 7,100,716 B2 * | 9/2006 | Engels et al. | ............ 180/65.1 |
| 2004/0032119 A1 * | 2/2004 | Tran et al. | ............ 280/755 |
| 2004/0060748 A1 | 4/2004 | Molnar | |
| 2004/0159476 A1 * | 8/2004 | Molnar | ............ 180/65.1 |
| 2004/0262859 A1 * | 12/2004 | Turturiello et al. | ...... 280/5.515 |
| 2005/0077714 A1 * | 4/2005 | Mulhern et al. | ............ 280/755 |
| 2005/0206124 A1 * | 9/2005 | Levi et al. | ............ 280/304.1 |
| 2005/0206149 A1 * | 9/2005 | Mulhern et al. | ............ 280/755 |
| 2006/0076747 A1 * | 4/2006 | Pauls et al. | ............ 280/124.11 |
| 2006/0201723 A1 * | 9/2006 | Hsu et al. | ............ 180/24.02 |

* cited by examiner

*Primary Examiner*—Toan To
(74) *Attorney, Agent, or Firm*—Frommer Lawrence & Haug LLP; Ronald R. Santucci

(57) ABSTRACT

A side frame assembly for an electric wheelchair suspension includes a supporting frame unit with a rider-supporting frame, a front caster frame, an upper link having a front end connected pivotally to the front caster frame, and a lower link disposed under the upper link and having a front end connected pivotally to the front caster frame. A drive wheel frame has a front lower end connected pivotally to a pivot portion of the supporting frame unit. A connecting frame has an upper pivot portion connected pivotally to a rear end of the upper link, a lower pivot portion connected pivotally to a rear end of the lower link, and a rear pivot portion connected pivotally to the rear upper end of the drive wheel frame.

10 Claims, 7 Drawing Sheets

WHEELCHAIR SUSPENSION

BACKGROUND OF THE INVENTION

1. Field of the Invention

This invention relates to an electric wheelchair, and more particularly to an electric wheelchair suspension.

2. Description of the Related Art

Referring to FIGS. 1 and 2, a conventional suspension disclosed in U.S. Patent Application Publication No. 2004/0060748 A1 is incorporated in an electric wheelchair, and has two side frame assemblies 1, each of which includes a front caster assembly 11, a rear caster assembly 12, a linkage 13, a drive wheel assembly 14, a driving unit 15 and a return spring unit 16.

The front caster assembly 11 includes a front mainframe 112, a front caster frame 113 extending downwardly from a front end of the front mainframe 112, a drive wheel frame 114 extending downwardly from a rear end of the front mainframe 112, and a front caster 115 disposed pivotally on a lower end of the front caster frame 113.

The rear caster assembly 12 includes a rear mainframe 122, a front connecting frame 123 extending downwardly from a front end of the rear mainframe 122, a rear caster frame 124 extending downwardly from a rear end of the rear mainframe 122, and a rear caster 125 disposed pivotally on a lower end of the rear caster frame 124. The rear mainframe 122 cooperates with the front mainframe 112 to support a seat (not shown).

The linkage 13 has two ends connected respectively and pivotally to the front caster frame 113 and the front connecting frame 123.

The drive wheel assembly 14 includes a drive wheel 141 that has a diameter greater than those of the front and rear casters 115, 125, and that is disposed pivotally on the corresponding drive wheel frame 114.

The driving unit 15 includes an electric motor 151 installed on the corresponding drive wheel frame 114 and operable to rotate the corresponding drive wheel 14.

The return spring unit 16 includes a front spring 162 interconnecting the corresponding front mainframe 112 and the corresponding front connecting frame 123, and a rear spring 162' interconnecting the corresponding drive wheel frame 114 and the corresponding rear mainframe 122.

Referring to FIGS. 2 and 3, because of the presence of the front and rear springs 162, 162', the drive wheel 141 and the front and rear casters 115, 125 can be brought into contact with a horizontal surface simultaneously.

Referring to FIG. 2, when the front caster 115 climbs onto an elevated surface 200 in the wheelchair's path, such as a sidewalk area, the front and rear springs 162, 162' are stretched so as to allow the front caster 115 to rise relative to the drive wheel 141 and the rear caster 125. After the rear caster 125 surmounts the elevated surface 200, the front and rear springs 162, 162' return to their original shapes so as to allow the front caster 115 to closely contact a top surface of the elevated surface 200.

FIG. 4 shows a time-height curve illustrating the elevated surface surmounting efficiency of the wheelchair installed with the side frame assemblies 1. As indicated by the time-height curve, the wheelchair takes about 4.6 seconds to surmount an elevated surface 200 having a height of about 60 cm. This is a significant amount of time and is indicative of an inferior elevated surface surmounting efficiency.

With such a configuration, when the front caster 115 comes into contact with the elevated surface 200, impact is transmitted directly from the front caster assembly 11 to the rear caster assembly 12 and, thus, to the rider sitting on the electric wheelchair. This results in rider discomfort. Furthermore, the maximum pivoting angle of the front caster assembly 11 is large. This further increases rider discomfort.

SUMMARY OF THE INVENTION

The object of this invention is to provide an electric wheelchair including an improved suspension that increases the elevated surface surmounting efficiency of the wheelchair and reduces rider discomfort when the wheelchair climbs onto an elevated surface.

According to this invention, an electric wheelchair includes a suspension that has two side frame assemblies. Each of the side frame assemblies includes a supporting frame unit with a rider-supporting frame, a front caster frame, an upper link having a front end connected pivotally to the front caster frame, and a lower link disposed under the upper link and having a front end connected pivotally to the front caster frame. A drive wheel frame has a front lower end connected pivotally to a pivot portion of the supporting frame unit. A connecting frame has an upper pivot portion connected pivotally to a rear end of the upper link, a lower pivot portion connected pivotally to a rear end of the lower link, and a rear pivot portion connected pivotally to a rear upper end of the drive wheel frame.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

A wheelchair suspension of this invention is incorporated in an electric wheelchair, and includes two side frame assemblies. Because the two side frame assemblies are similar in construction to each other, the structure and operation of only one side frame assembly will be described.

Figure 5:
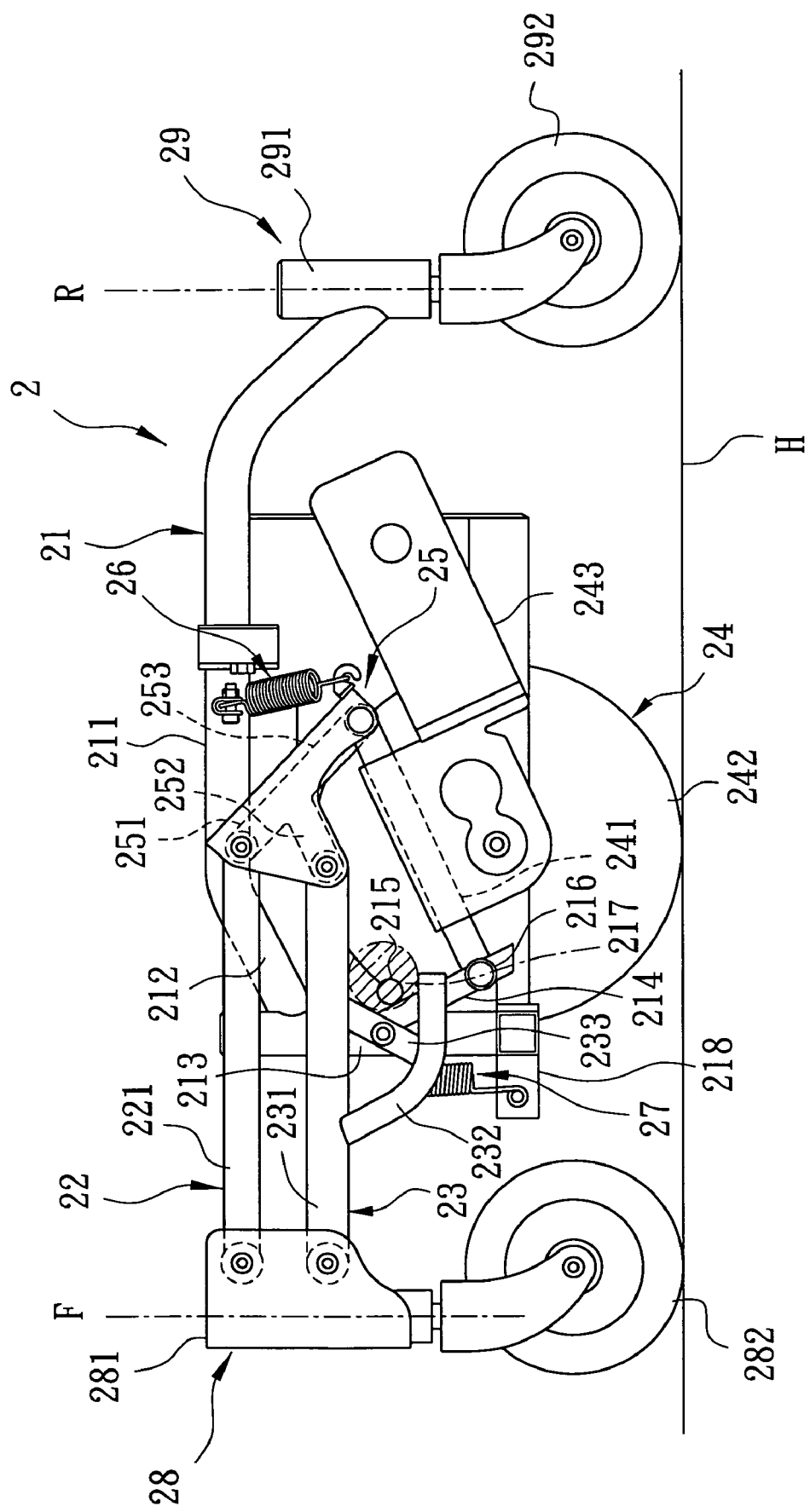
FIG. 5 is a side view of a side frame assembly of the preferred embodiment of an electric wheelchair suspension according to this invention.

Referring to FIG. 5, a side frame assembly 2 of the preferred embodiment of a wheelchair suspension according to this invention includes a generally inverted U-shaped supporting frame unit 21, an upper link unit 22, a lower link unit 23, a drive wheel assembly 24, a connecting frame 25, a first resilient return device 26, a second resilient return device 27, a first caster assembly 28, and a rear caster assembly 29. The first and second resilient return devices 26, 27 are configured as coiled tension springs.

The supporting frame unit 21 includes a rider-supporting frame 211 for supporting the wheelchair rider, an inclined frame 212 extending integrally, frontwardly, and downwardly from a front end of the rider-supporting frame 211, an upright frame 213 having an upper end portion connected fixedly to a front lower end of the inclined frame 212, an inclined pivot portion 214 connected fixedly to and extending rearwardly and downwardly from a lower end of the upright frame 213, a horizontal stop rod 215 connected integrally to an upper portion of the pivot portion 214, and a horizontal pivot rod 216 connected fixedly to a lower portion of the pivot portion 214. The pivot portion 214 is disposed below the rider-supporting frame 211. The supporting frame unit 21 further includes a spring connecting portion 218 connected fixedly to and extending horizontally and frontwardly from a lower end of the upright frame 213.

The front caster assembly 28 includes a front caster frame 281 disposed in front of the first frame unit 21, and a front caster 282 disposed rotatably on the front caster frame 281 and rotatable about a vertical axis (F).

The upper link unit 22 includes an upper link 221 having a front end connected pivotally to the front caster frame 281.

The lower link unit 23 includes a lower link 231, a curved limiting frame 232, and a connecting rod 233. The lower link 231 is disposed under the upper link 221, and has a front end connected pivotally to the front caster frame 281 and that is disposed under the front end of the upper link 221. The limiting frame 232 extends downwardly and rearwardly from a front portion of the lower link 231, and has a rear end portion disposed under the stop rod 215 of the supporting frame unit 21 so as to confine the stop rod 215 between the lower link 231 and the limiting frame 232. The spring connecting portion 218 of the supporting frame unit 21 is disposed under the limiting frame 232. The connecting rod 233 has two ends connected respectively and fixedly to the lower link 231 and the limiting frame 232. In this embodiment, the connecting rod 233 is disposed in proximity to the stop rod 215, and cooperates with the lower link 231 and the limiting frame 232 so as to define a limiting space 217 (shown by the shaded area), within which the stop rod 215 is confined.

The drive wheel assembly 24 includes an elongated drive wheel frame 241 having a front lower end connected pivotally to the pivot rod 216 of the supporting frame unit 21, a drive wheel 242 disposed rotatably on the drive wheel frame 241, and a driving unit 243 operable to rotate the drive wheel 242. The driving unit 243 includes an electric motor disposed on the drive wheel frame 241.

The connecting frame 25 has an upper pivot portion 251 connected pivotally to a rear end of the upper link 221, a lower pivot portion 252 disposed under the upper pivot portion 251 and connected pivotally to a rear end of the lower link 231, and a rear pivot portion 253 disposed behind the upper and lower pivot portions 251, 252. The rear pivot portion 253 is connected pivotally to a rear upper end of the drive wheel frame 241, and is disposed under the rider-supporting frame 211 of the supporting frame unit 21.

The first resilient return device 26 interconnects the rider-supporting frame 211 and the rear pivot portion 253 of the connecting frame 25 so as to bias the rear pivot portion 253 upwardly toward the rider-supporting frame 211.

The second resilient return device 27 interconnects the spring connecting portion 218 of the supporting frame unit 21 and the limiting frame 232 of the lower link unit 23 so as to bias the limiting frame 232 downwardly toward the spring connecting portion 218.

The rear caster assembly 29 includes a rear caster frame 291 connected fixedly to and disposed behind the rider-supporting frame 211, and a rear caster 292 disposed rotatably on the rear caster frame 291 and rotatable about a vertical axis I.

When the front and rear casters 282, 292 and the drive wheel 242 are in contact with a horizontal surface (H), the upper and lower links 221, 231 are generally horizontal and parallel to each other, and the stop rod 215 is generally perpendicular to the upper and lower links 221, 231.

Figure 6:
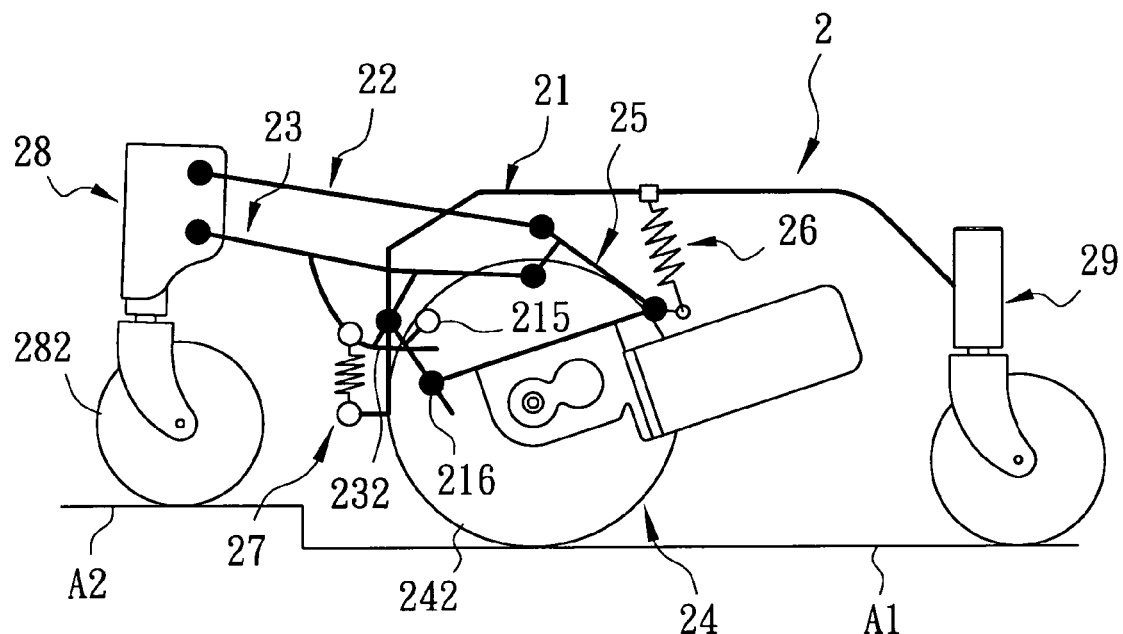
FIG. 6 is a schematic side view of the preferred embodiment when a front caster is disposed on a high area and when a drive wheel is disposed on a low area.
Figure 7:
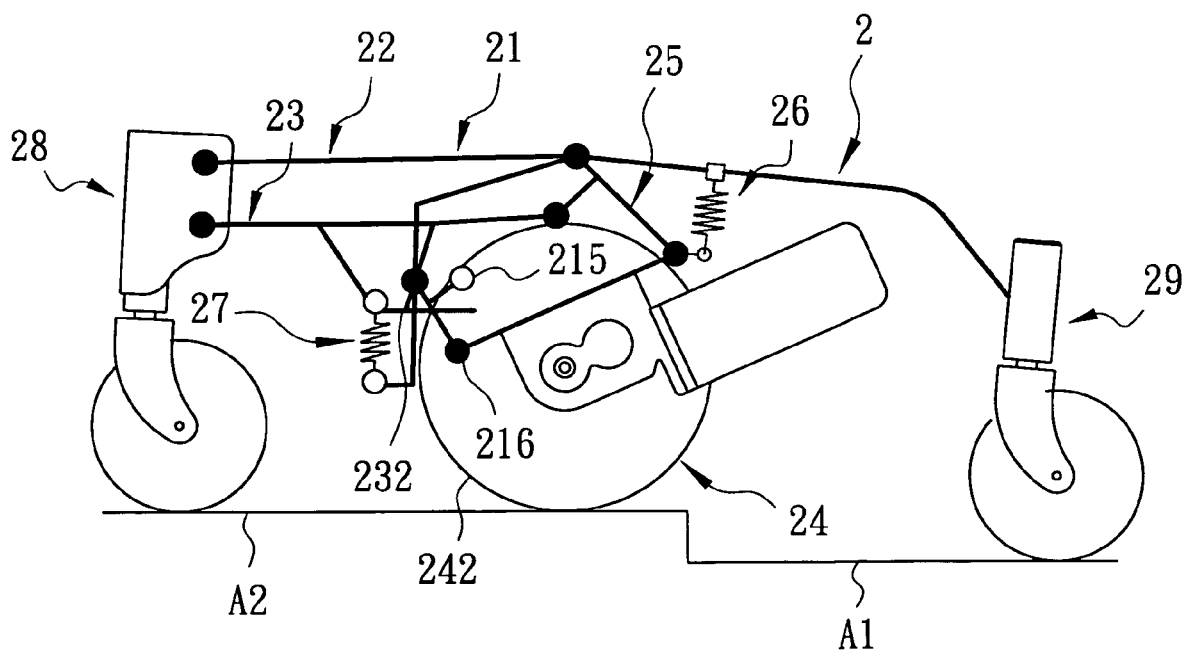
FIG. 7 is a schematic side view of the preferred embodiment when the drive wheel is disposed on the high area and when a rear caster is disposed on the low area.

With further reference to FIG. 6, in the case where the wheelchair moves from a low area (A1) onto a high area (A2), when the front caster 282 and the drive wheel 242 are disposed respectively on the high and low areas (A2) (i.e., a lower end of the front caster 282 is above that of the drive wheel 242), the upper and lower links 221, 231 are inclined frontwardly and upwardly. As such, the first resilient return device 26 is stretched so as to store a return force. Subsequently, when the drive wheel 242 moves onto the high area (A2), the first resilient return device 26 returns to its original shape, as shown in FIG. 7.

Figure 9:
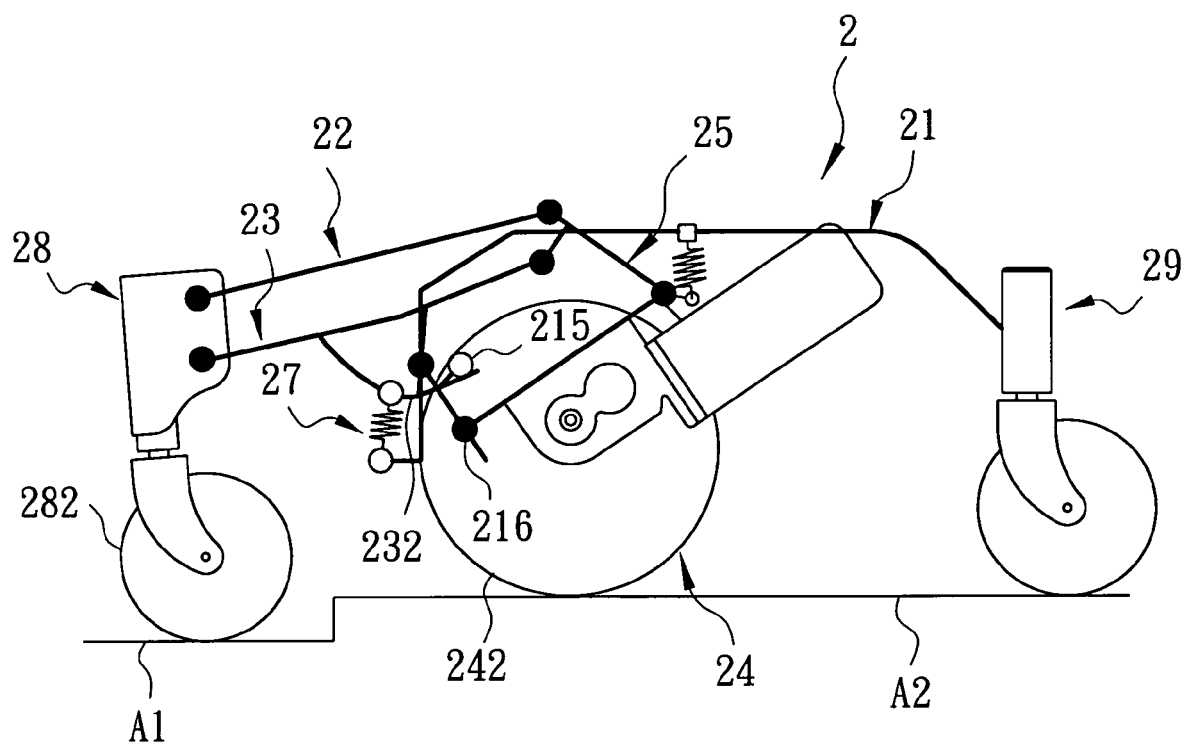
FIG. 9 is a schematic side view of the preferred embodiment when the front caster is disposed on the low area and when the drive wheel is disposed on the high area.

With additional reference to FIG. 9, in the case where the wheelchair moves from a high area (A2) onto a low area (A1), when the front caster 282 and the drive wheel 242 are disposed respectively on the low and high areas (A1, A2) (i.e., the lower end of the front caster 282 is below that of the drive wheel 242), the upper and lower links 221, 231 are inclined frontwardly and downwardly. When the front end of the lower link 231 pivots downwardly by a predetermined angle, the limiting frame 232 comes into contact with the stop rod 215, as shown in FIG. 9. This prevents further downward pivoting movement of the lower link 231.

Figure 1:
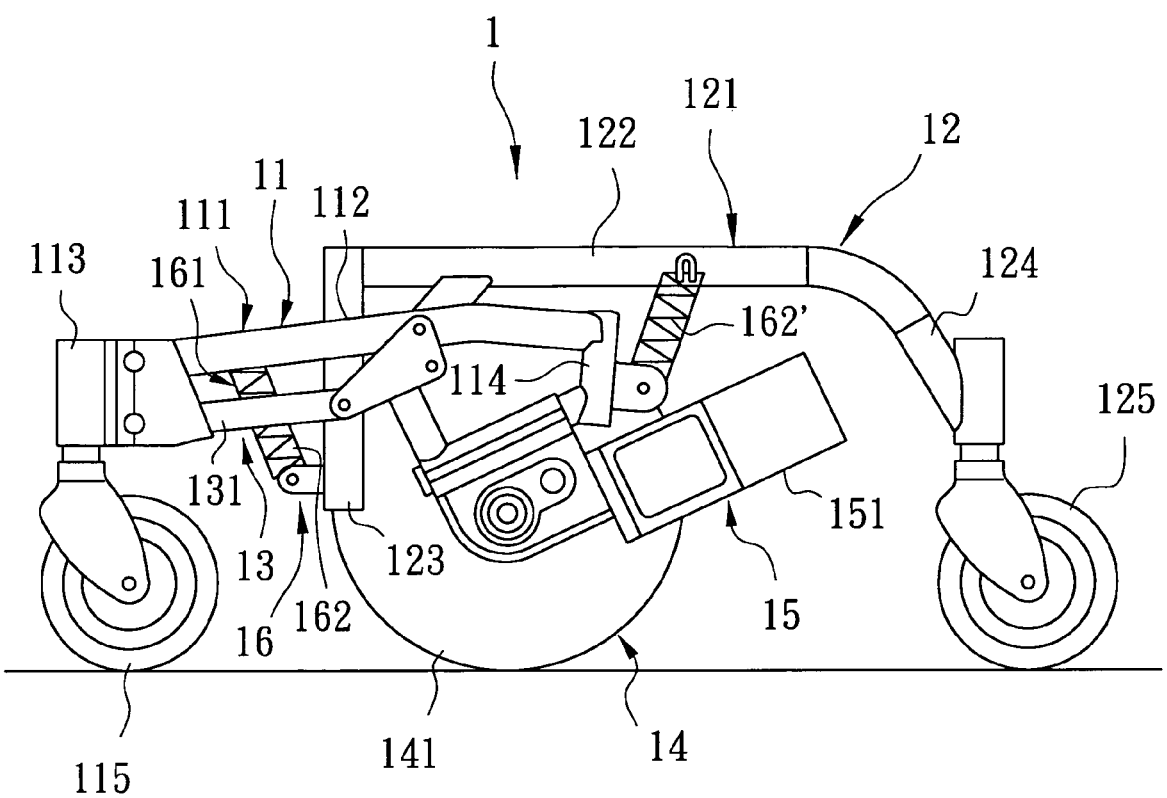
FIG. 1 is a side view of a side frame assembly of a suspension of a conventional electric wheelchair.
Figure 2:
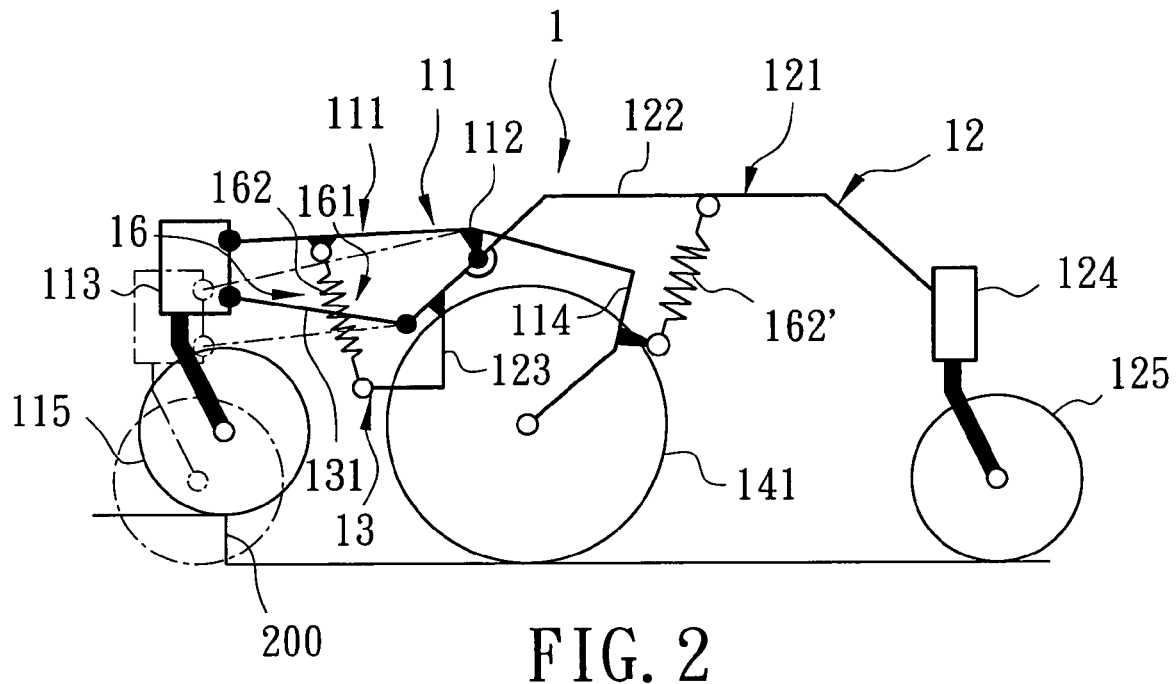
FIG. 2 is a schematic side view of the side frame assembly of the suspension of the conventional electric wheelchair, illustrating how a front caster climbs onto an elevated surface.
Figure 3:
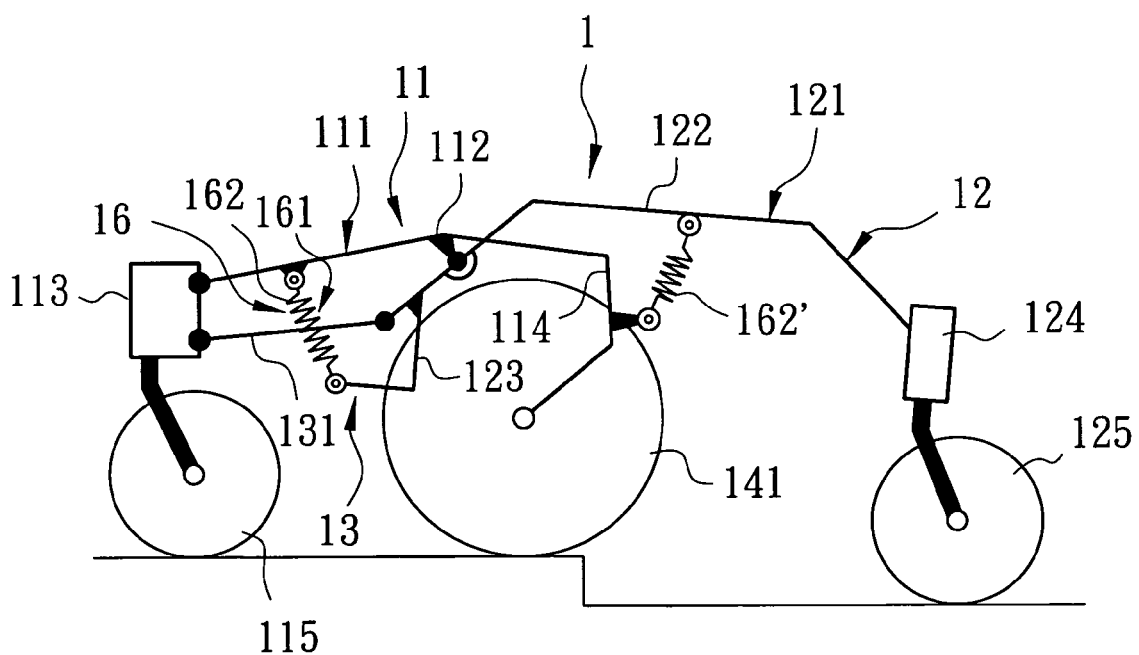
FIG. 3 is a schematic side view of the side frame assembly of the suspension of the conventional electric wheelchair, illustrating how a drive wheel climbs onto an elevated surface.
Figure 4:
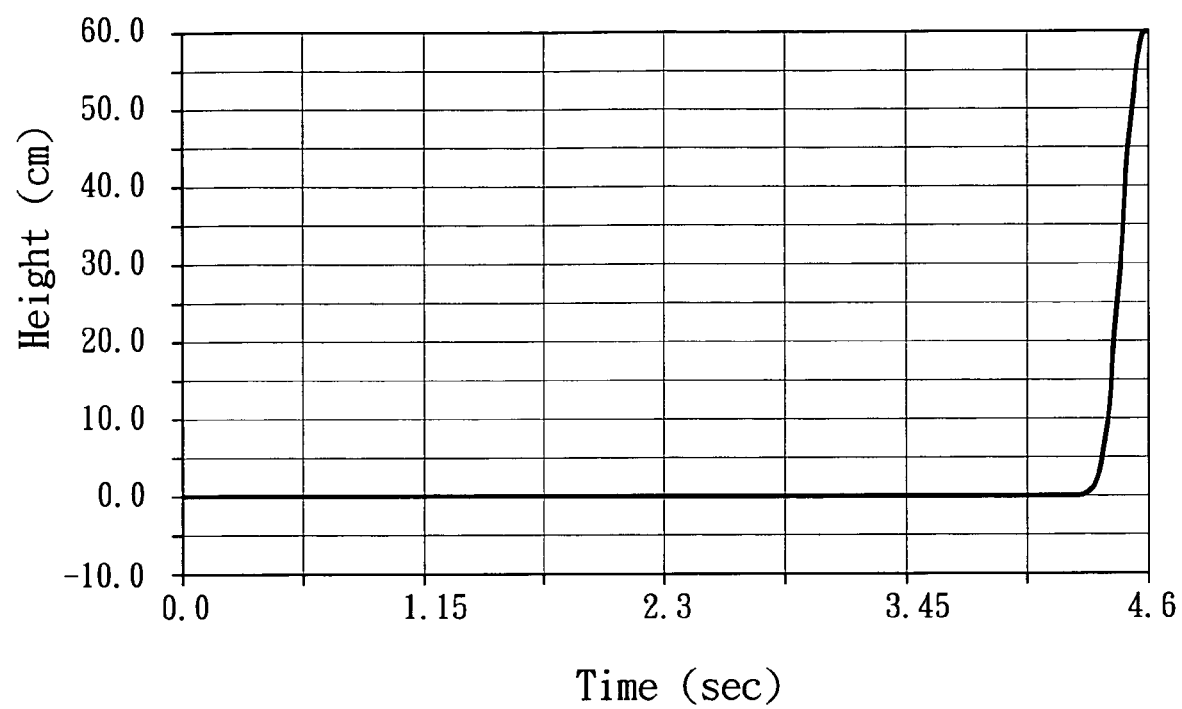
FIG. 4 shows a height-time curve illustrating the elevated surface surmounting efficiency of the conventional electric wheelchair.
Figure 8:
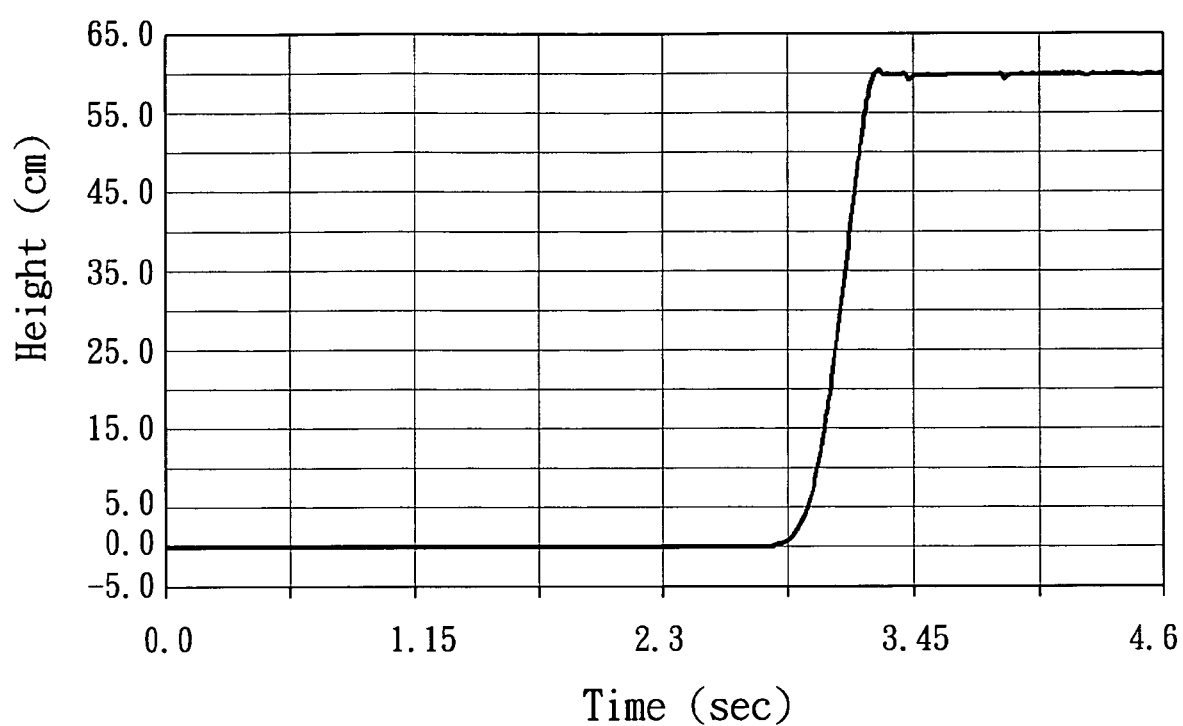
FIG. 8 is a graph of a height-time curve illustrating the elevated surface surmounting efficiency of the wheelchair mounted with the preferred embodiment.

Due to the presence of the connecting frame 25 and the first and second resilient return devices 26, 27, the wheelchair takes about 2.8 seconds to 3.2 seconds to surmount an elevated surface having a height of about 60 cm, as shown by the height-time curve in FIG. 8. Thus, the wheelchair configured with the suspension of this invention has a superior elevated surface surmounting efficiency over the prior art configuration shown in FIGS. 1-3.

Since the stop rod 215 is confined between the lower link 231 and the limiting frame 232, the maximum pivoting angles of the upper and lower links 221, 231 are small. This reduces rider discomfort when surmounting an elevated surface.

Furthermore, since the front caster assembly 28 is connected to the supporting frame unit 21 by the upper and lower link units 22, 23 and the connecting frame 25, when the wheelchair climbs onto an elevated surface, such as a sidewalk, the wheelchair rider experiences very little impact and instability.

With this invention thus explained, it is apparent that numerous modifications and variations can be made without departing from the scope and spirit of this invention. It is therefore intended that this invention be limited only as indicated by the appended claims.

We claim:

1. A side frame assembly for an electric wheelchair suspension characterized by:
   a supporting frame unit including a rider-supporting frame, and a pivot portion connected fixedly to and disposed below said rider-supporting frame;
   a front caster assembly including a front caster frame disposed in front of said first frame unit, and a front caster disposed rotatably on said front caster frame;
   an upper link unit including an upper link having a front end connected pivotally to said front caster frame;
   a lower link unit including a lower link that is disposed under said upper link and that has a front end, which is connected pivotally to said front caster frame and which is disposed under said front end of said upper link;
   a drive wheel assembly including a drive wheel frame having a front lower end connected pivotally to said pivot portion of said supporting frame unit, and a rear upper end, a drive wheel disposed rotatably on said drive wheel frame, and a driving unit operable to rotate said drive wheel; and
   a connecting frame having an upper pivot portion connected pivotally to a rear end of said upper link, a lower pivot portion disposed under said upper pivot portion and connected pivotally to a rear end of said lower link, and a rear pivot portion that is disposed behind said upper and lower pivot portions, that is connected pivotally to said rear upper end of said drive wheel frame, and that is disposed under said rider-supporting frame of said supporting frame unit.

2. The side frame assembly as claimed in claim 1, further comprising a first resilient return device interconnecting said rider-supporting frame and said rear pivot portion of said connecting frame so as to bias said rear pivot portion upwardly toward said rider-supporting frame.

3. The side frame assembly as claimed in claim 1, further comprising a rear caster assembly that includes a rear caster frame connected fixedly to and disposed behind said rider-supporting frame, and a rear caster disposed rotatably on said rear caster frame.

4. The side frame assembly as claimed in claim 3, wherein, when said front and rear casters and said drive wheel are in contact with a horizontal surface, said upper and lower links are generally horizontal and parallel to each other so that, when a lower end of said front caster is below that of said drive wheel, said upper and lower links are inclined frontwardly and downwardly, and when said lower end of said front caster is above that of said drive wheel, said upper and lower links are inclined frontwardly and upwardly.

5. The side frame assembly as claimed in claim 4, wherein
   said pivot portion of said supporting frame unit is formed with a horizontal integral stop rod that is disposed under said lower link and that is generally perpendicular to said upper and lower links when said front and rear casters and said drive wheel are in contact with said horizontal surface; and
   said lower link unit further includes a curved limiting frame extending downwardly and rearwardly from a front portion of said lower link and having a rear end portion disposed under said stop rod of said supporting frame unit so as to confine said stop rod between said lower link and said limiting frame, said limiting frame being positioned such that, when said front end of said lower link pivots downwardly by a predetermined angle, said limiting frame comes into contact with said stop rod so as to prevent further downward pivoting movement of said lower link.

6. The side frame assembly as claimed in claim 5, further comprising a second resilient return device, said supporting frame unit further including a spring connecting portion connected fixedly to said rider-supporting frame and disposed under said limiting frame of said lower link unit, said second resilient return device interconnecting said spring connecting portion and said limiting frame so as to bias said limiting frame downwardly toward said spring connecting portion.

7. The side frame assembly as claimed in claim 5, wherein said lower link unit further includes a connecting rod having two ends connected respectively to said lower link and said limiting frame, said connecting rod being disposed in proximity to said stop rod and cooperating with said lower link and said limiting frame so as to define a limiting space, within which said stop rod is confined.

8. The side frame assembly as claimed in claim 3, wherein said rear caster is rotatable about a vertical axis.

9. The side frame assembly as claimed in claim 1, wherein said front caster is rotatable about a vertical axis.

10. The side frame assembly as claimed in claim 1, wherein said driving unit includes an electric motor disposed on said drive wheel frame.

* * * * *